US011538176B2

United States Patent
Kabus

(10) Patent No.: US 11,538,176 B2
(45) Date of Patent: Dec. 27, 2022

(54) IMAGE PROCESSING SYSTEMS AND METHODS

(71) Applicant: KONINKLIJKE PHILIPS N.V., Eindhoven (NL)

(72) Inventor: Sven Kabus, Hamburg (DE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 648 days.

(21) Appl. No.: 15/777,489

(22) PCT Filed: Dec. 7, 2016

(86) PCT No.: PCT/EP2016/079969
§ 371 (c)(1),
(2) Date: May 18, 2018

(87) PCT Pub. No.: WO2017/102468
PCT Pub. Date: Jun. 22, 2017

(65) Prior Publication Data
US 2018/0336689 A1    Nov. 22, 2018

(30) Foreign Application Priority Data
Dec. 15, 2015   (EP) .................................... 15200216

(51) Int. Cl.
*G06T 7/33*        (2017.01)
*G06T 7/30*        (2017.01)
(Continued)

(52) U.S. Cl.
CPC ................ *G06T 7/337* (2017.01); *G06T 7/11* (2017.01); *G06T 7/149* (2017.01); *G06T 7/30* (2017.01);
(Continued)

(58) Field of Classification Search
CPC ... G06T 7/30; G06T 7/11; G06T 7/337; G06T 7/149; G06T 2207/30061; G06T 2207/10081
See application file for complete search history.

(56) References Cited

U.S. PATENT DOCUMENTS

| | | | |
|---|---|---|---|
| 7,155,047 B2 | 12/2006 | Wollenweber | |
| 2008/0123927 A1* | 5/2008 | Miga | G06T 7/344 382/131 |

(Continued)

FOREIGN PATENT DOCUMENTS

| | | |
|---|---|---|
| CN | 103632338 A | 3/2014 |
| WO | 2004051571 A2 | 6/2004 |

(Continued)

OTHER PUBLICATIONS

Wachinger, C., "Simultaneous Registration of Multiple Images: Similarity Metrics and Efficient Optimization", IEEE Transactions on Pattern Analysis and Machine Intelligence, pp. 1-13, (2012).

(Continued)

*Primary Examiner* — Vu Le
*Assistant Examiner* — Tracy Mangialaschi

(57) ABSTRACT

Systems and methods for iteratively computing an image registration or an image segmentation are driven by an optimization function that includes a similarity measure component whose effect on the iterative computations is relatively mitigated based on a monitoring of volume changes of volume elements at image locations during the iterations. A system and a related method quantify a registration error by applying a series of edge detectors to input images and combining related filter responses into a combined response. The series of filters are parameterized with a filter parameter. An extremal value of the combined response is then found and a filter parameter associated with (Continued)

said extremal value is then returned as output. This filter parameter relates to a registration error at a given image location.

12 Claims, 9 Drawing Sheets

(51) Int. Cl.
*G06T 7/11* (2017.01)
*G06T 7/149* (2017.01)

(52) U.S. Cl.
CPC ............. *G06T 2207/10081* (2013.01); *G06T 2207/30061* (2013.01)

(56) References Cited

U.S. PATENT DOCUMENTS

| | | | |
|---|---|---|---|
| 2009/0074276 A1 | 3/2009 | Doi et al. | |
| 2009/0080779 A1* | 3/2009 | Chefd'hotel | G06K 9/6206 382/209 |
| 2009/0116761 A1* | 5/2009 | Wheaton | A61B 5/055 382/254 |
| 2013/0028490 A1 | 1/2013 | Kim et al. | |
| 2013/0322723 A1* | 12/2013 | Akhbardeh | G06T 7/337 382/131 |
| 2014/0314295 A1 | 10/2014 | Omi | |
| 2015/0139503 A1* | 5/2015 | Kabus | G06T 7/30 382/107 |
| 2016/0217576 A1* | 7/2016 | Kabus | A61B 6/469 |

FOREIGN PATENT DOCUMENTS

| | | |
|---|---|---|
| WO | 2006015971 A1 | 2/2006 |
| WO | 2006051488 A1 | 5/2006 |
| WO | 2014001959 A1 | 1/2014 |
| WO | WO-2014001959 A1 * | 1/2014 |

OTHER PUBLICATIONS

Toth, et al., "A domain constrained deformable (DoCD) model for co-registration of pre- and post-radiated prostate MRI", Neurocomputing 144, 2014, pp. 3-12.

Li, et al., "Voxel-based statistical analysis of uncertainties associated with deformable image registration", Phys Med Biol., Sep. 21, 2013; 58(18); pp. 1-23.

Papastavrou, Y., "Use of Multicomponent Non-Rigid Registration to Improve Alignment of Serial Oncological PET/CT Studies", A thesis submitted to University College London for the degree of Doctor of Philosophy (Ph. D.) in Medical Physics applied to Nuclear Medicine, Jan. 2015, pp. 1-208.

\* cited by examiner

IMAGE PROCESSING SYSTEMS AND METHODS

This application is the U.S. National Phase application under 35 U.S.C. § 371 of International Application No. PCT/EP2016/079969, filed on Dec. 7, 2016, which claims the benefit of European Application Serial No. 15200216.8, filed Dec. 15, 2015. These applications are hereby incorporated by reference herein.

FIELD OF THE INVENTION

The invention relates to image processing systems, image processing methods, to computer program elements and to computer readable media.

BACKGROUND OF THE INVENTION

Image registration (also referred to as image alignment or image fusion) is needed in various clinical applications, e.g., for spatial alignment of image data from different protocols, modalities, patient positioning, acquisition times, or contrast states.

In clinical workstations, image registration is employed in viewer functionalities. These functionalities allow viewing different image datasets side-by-side. The user selects by mouse-click or otherwise a location in the first image dataset and the second image data set is then automatically scrolled to the anatomically corresponding position.

Other applications of image registration may be found in perfusion analysis systems or in time series analysis systems. Frames acquired in a fluoroscopic imaging series are aligned with respect to a reference frame to then perform perfusion parameter estimation.

Yet other image registration applications are in multi-modality liver analysis, cardiac analysis, prostate analysis, and general follow-up analysis. Most of these applications require non-rigid or non-affine registration, that is, a dense vector field of displacements is searched for instead of just six or twelve parameters for a rigid or affine transformation.

Another important image processing task is automatic image segmentation where one wishes to find image structure of interest such as organ delineations.

Unfortunately it has been found that certain imperfections in the input imagery can cause severe underperformance of registration or segmentation algorithms that otherwise have been known to yield accurate results.

Also, in relation to image registration, a mechanism to detect sub-optimal accuracy is desirable to ensure a defined level of accuracy for applications in clinical practice. This is because accurate image alignment has been found to be of relevance for a host of subsequent image processing steps or visualizations.

Accuracy of image registration can be estimated in several ways. Qualitative measurements (e.g., visual ranking) tend to be less time-consuming (but less accurate) than quantitative measurements (e.g., annotated landmarks, functional validation).

SUMMARY OF THE INVENTION

There may therefore be a need for alternative systems or method for image registration or image segmentation or for a system or method for supporting registration tasks.

The object of the present invention is solved by the subject matter of the independent claims where further embodiments are incorporated in the dependent claims. It should be noted that the following described aspect of the invention equally applies to the image processing methods, to the computer program elements and to the computer readable media.

According to a first aspect of the invention there is provided an image processing system, comprising:

an input port for receiving two or more input images for registration, including a source image and a target image;

an iterative solver configured to solve for a final registration transformation $T(N)$ by iterating through at least one intermediate registration transformation $T(N-j)$, wherein the iterative solver is driven by an optimization function comprising at least one functional component based on a similarity measure that measures a similarity between the target image and a transformed image obtainable by applying the at least one intermediate registration transformation to the source image, a volume monitor configured to monitor, during the iteration, for a change in volume of a neighborhood around an image location in the source image when the intermediate registration transformation is being applied;

a volume evaluator configured to evaluate said volume change against an acceptance condition; and a corrector configured to mitigate, or at least relatively mitigate, for a subsequent iteration, an effect of the first functional component for said image location, when the change is found by the image evaluator to violate said acceptance condition. The acceptance condition is based on the change in volume of the neighborhood around the image location. "Volume" as used herein includes volume in 3D (three dimensional) or "volume" (usually referred to as "area") in 2D (two dimensional), depending on the dimensionality of the input imagery.

In other words, the proposed registration system includes a self-correcting feature where at least a part of an update function based on the objective (or cost) function is automatically mitigated in response to volume changes at individual image locations during iterations. Mitigation includes preferably full suppression, but partial suppression may be sufficient for some embodiment. This self-correcting feature has been found to render the proposed registration algorithm more robust against artifacts or anomalies encoded in the input imagery.

According to one embodiment said first functional component remains mitigated for said image location during the remainder of the iteration.

The cost or objective function includes generally (but necessarily) more than one functional component. In particular the cost function includes, in addition to said functional component for similarity, a regularizer component to enforce certain desirable image properties such as smoothness, etc. But the corrector, in one embodiment, is configured to only mitigate said functional component for the similarity measure and not the regularizer. The regularizer remains effective throughout the iterations. Mitigation can be a mere down-weighting or a complete elimination by multiplication with suitable factors <1 or a factor "0", respectively.

The functional components of the cost function usually have corresponding functional counterparts in an update function derivable from the cost function. The update function is used for the iteration and in one embodiment it is the corresponding functional component in the update function that is mitigated by the corrector to so control the effect of the similarity measure in the iterations.

Conversely to the above "direct" mitigation, relative mitigation can be achieved by up-weighting or amplifying the regularizer or other terms whilst the similarity measure component as such remains as is. In short, the similarity measure component is either down-weighted whilst the regularizer remains unaffected or the regularizer (or at least one other term) is amplified or up-weighted whilst the similarity measure component remains unaffected.

The transformations considered during the iterations are of the non-affine type and include in particular deformation and/or a shearing. These types of non-affine transformations may be represented by vector fields from which local volume element changes can be deduced. A volume element is for instance a neighborhood (e.g., a sphere or circle or any other shape) of image elements centered around respective image locations.

According to a second aspect there is provided an image processing method, comprising:

receiving two or more input images for registration, including a source image and a target image;

iteratively solving for a final registration transformation T(N) by iterating through at least one intermediate registration transformation T(N−j), wherein the iterative solver is driven by an optimization function comprising at least one functional component based on a similarity measure that measures a similarity between the target image and a transformed image obtainable by applying the at least one intermediate registration transformation to the source image, monitoring, during the iteration, for a change in volume of a neighborhood around an image location in the source image when the intermediate registration transformation is being applied;

evaluating said volume change against an acceptance condition; and for a subsequent iteration, relatively mitigating an effect of the first functional component for said image location, when the change is found by the image evaluator (IVE) to violate said acceptance condition.

The self-correcting feature may be used in a similar fashion in a model-based segmentation algorithm. In other words, according to a third aspect there is provided an image processing system, comprising:

an input port for receiving an input image for model-based segmentation;

an iterative solver configured to solve for a final segmentation by iterating through at least one intermediate geometrical state of an initial model, wherein the iterative solver is driven by an optimization function comprising at least one functional component, including a first functional component based on an image feature measure that measures at least one image feature in at least one image location in the input image during the iteration, a model monitor, configured to monitor a geometry change of the model during the iteration;

a geometry change evaluator configured to evaluate said geometry change against an acceptance condition; and a corrector configured to relatively mitigate, for a subsequent iteration, an effect of the first functional component for said image location, when the geometry change is found by the geometry change evaluator to violate said acceptance condition.

According to one embodiment the acceptance condition is based on a deformation of the model.

Again, similar to the registration embodiment, the cost function preferably includes an additional functional component that measures properties of the model and evaluates how the model is being changed (e.g. deformed) during iterations. Again, in one embodiment and in order to achieve relative mitigation, the corrector will only mitigate the image feature component and not the functional component that measures the properties of the model. Again, mitigation can be a mere down-weighting or a complete elimination. Conversely, the image feature component remains as is, but now the functional component for the model properties is amplified or up-weighted. The mitigation action can again be implemented by mitigating or amplifying corresponding functional components in the update function of the iteration.

According to a third aspect there is provided an image processing method, comprising:

receiving an input image for model-based segmentation;

iteratively solving for a final segmentation by iterating through at least one intermediate geometrical state of an initial model, wherein the iterative solver is driven by an optimization function comprising at least one functional component based on an image feature measure that measures at least one image feature in at least one image location in the input image during the iteration, monitoring a geometry change of the model during the iteration;

evaluating said geometry change against an acceptance condition; and for a subsequent iteration, relatively mitigating an effect of the first functional component for said image location, when the geometry change is found by the geometry change evaluator to violate said acceptance condition.

In the above embodiments, the change in volume or geometry is taken relative to the volume or geometry as per the earlier iteration step. In particular, an initial neighborhood or geometry is defined for respective images locations and the changes are monitored throughout the one or more following iteration steps.

According to a fifth aspect there is provided an image processing system for evaluating a registration result, comprising:

an input port for receiving two or more input images;

a test module configured to apply a series of parameterized edge detection filters to the two or more images to produce a series of different filter responses per input image, wherein the detection filters in the series are parameterized with a filter parameter that relates to a characteristic of the respective edge detection filter;

a combiner configured to combine respective responses from the two or more images into a combined response that varies non-monotonically as a function of the filter parameter;

an extremal value finder configured to find, as a function of the filter parameter, an extremal value of said combined response; and an output port configured to output, from among the filter parameters, a filter parameter that is associated with said extremal value, the so output filter parameter being related to a quality metric for a registration result at an image location.

According to one embodiment the combiner operates to point-wisely multiply respective responses to form weights per image location along at least one spatial dimension of the images. More specifically and according to one embodiment the combiner operates to sum said weights to obtain the combined response.

According to one embodiment the at least one of the edge detection filters is based on a second or higher order image derivative.

More specifically and according to one embodiment the filter parameter relates to a derivative kernel of the second or higher order derivative. Yet more specifically and according to one embodiment, the derivate kernel is based on a Gaussian distribution and wherein the filter parameter specifies the standard deviation of said Gaussian distribution.

Constructing the combined response (surface or array) in this manner has been observed to yield registration accuracy which is robust against noise and is able to cope with the case where the two input images stem from different imaging modalities. False positive responses can be minimized or avoided altogether.

According to one embodiment, the system comprises a visualizer configured to visualize on a display device, the output quality metric per image location. In other words, an accuracy map can be generated and output so the user can ascertain the locations where the registration does yield good correspondence and those locations where it does not. The locations with relatively high registration can be found by visual inspection. In yet other words, the system as proposed herein allows to spatially resolve the amount of registration error.

According to a sixth aspect there is provided an

Image processing method for evaluating a registration result, comprising:

receiving two or more input images;

applying a series of parameterized edge detection filters to the two or more images to produce a series of different filter responses per input image, wherein the detection filters in the series are parameterized with a filter parameter that relates to a characteristic of the respective edge detection filter;

combining respective responses from the two or more images into a combined response that varies non-monotonically as a function of the filter parameter;

finding, as a function of the filter parameter, an extremal value of said combined response; and outputting, from among the filter parameters, a filter parameter that is associated with said extremal value, the so output filter parameter being related to a quality metric for a registration result at an image location.

The proposed registration accuracy quantification can be applied to real patient data rather than to mere test data as has been done in the past. Also, the proposed method yields an accuracy map, thus furnishing a per image location estimate. An accuracy evaluation can thus be based potentially on an entire dataset rather than only a relatively small set of image positions or viewing planes. In short, the proposed method allows for a localized quantitative accuracy estimation. The accuracy estimation can be expressed locally in a suitable length dimension, for instance in mm or cm, etc.

The proposed method and systems for registration or segmentation and registration accuracy quantification can be used for any imaging modality or combination of imaging modalities. In particular, the proposed methods and systems can be used for non-periodic image data sets, that is, image data sets that are not periodic over acquisition time.

BRIEF DESCRIPTION OF THE DRAWINGS

Exemplary embodiments of the invention will now be described with reference to the following drawings, wherein.

DETAILED DESCRIPTION OF EMBODIMENTS

Figure 1:
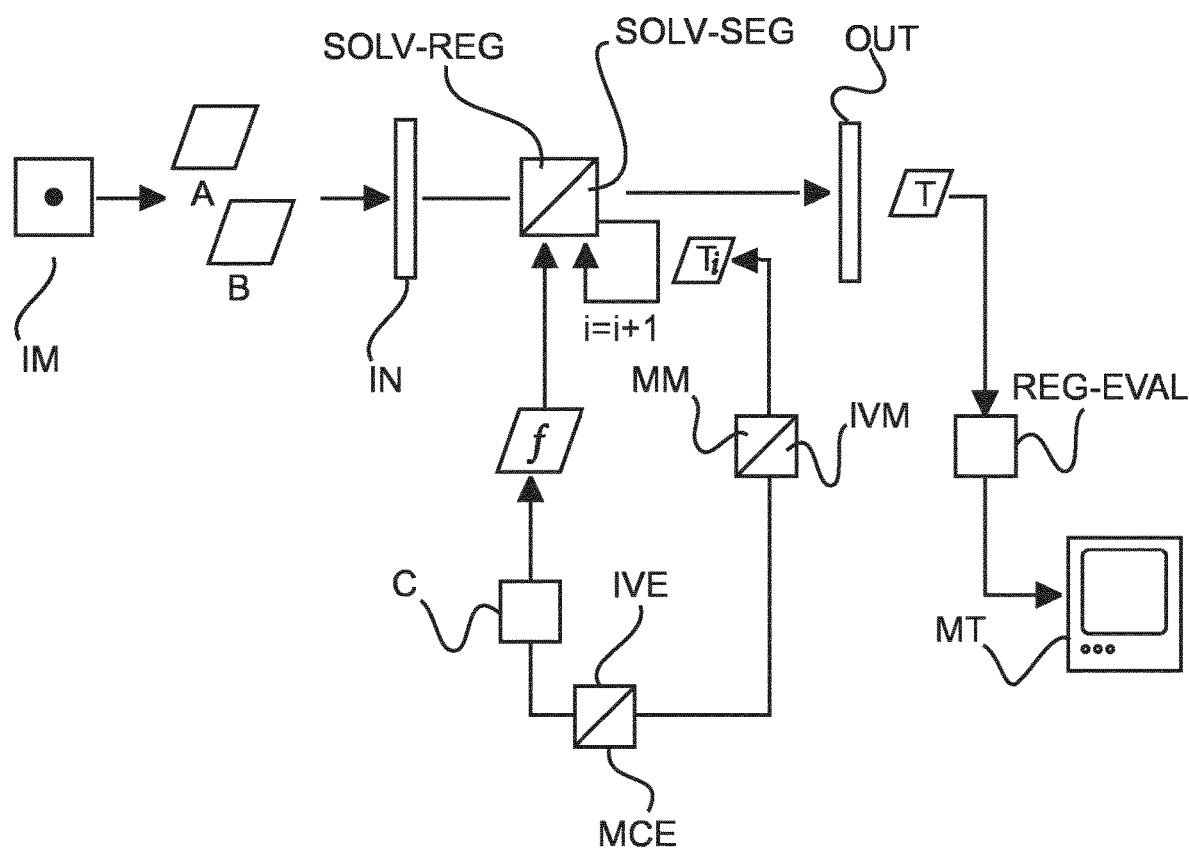
FIG. 1 shows a block diagram of an image processing system.

With reference to FIG. 1 there is shown a schematic block diagram of an image processing arrangement IPS.

The image processing arrangement (or "super"-system) IPS comprises, in broad terms, an image registration or segmentation system—shown to the left of FIG. 1 and a registration evaluation system—shown on the right. Both—systems are, as such, self-contained systems in their own right but can be used of course in conjunction, as shown in FIG. 1. More particularly, it is understood herein that each system can operate separately from the other, but may be arranged, if necessary, to operate in cooperation in a super-system as shown in FIG. 1.

The image processing system IPS arrangement operates on digital images schematically shown as A, B, acquired by an imaging apparatus IM. Any sort of imaging apparatus, medical or not, is envisaged herein and includes in particular the following non-exhaustive list of imaging modalities: an X-ray imaging apparatus such as CT or C-arm, an MRI or (SPECT) or PET imaging apparatus, an ultrasound apparatus and others. Although the two images A, B may have been acquired by the same imaging modality, a multi-model context is also envisaged herein where the images have been acquired by different imaging modalities. For instance, the images A, B may not necessarily be both X-ray images. In an example for modal-modal imaging, one image A may be an X-ray image whereas the other image B is an ultrasound image. Any other combination of image modalities is also envisaged herein. Although in the above and the following, reference is made to the "two images" A, B, these should be interpreted conceptually as a mere, but convenient, shorthand since, of course, the system is capable to operate on more than two images.

The images A, B for image data comprise image elements. Image elements are also called pixels or voxels depending on whether the image data is 2D or 3D respectively. Any image element is defined by a location in 2D or 3D which can be conveniently described by co-ordinates $(i, j)$ in 2D or by $(i, j, k)$ in 3D. In addition to this location information, there is an image value assigned to any of these locations. The image value represents numerically a physical property such as x-ray attenuation in x-ray imagery. The image value is convertible into grey value or color values if a visualization is desired. Individual image values—sometimes referred to as "intensities"—represent a quality or quantity of a specific property under consideration at the time of image acquisition. For instance, in X-ray imaging the image values or intensities (commonly mapped to range from white to black) indicate different degrees of x-ray attenuation. The attenuation is that experienced by a ray of x-radiation after passage through an image specimen (such as a patient) and is as "seen" or detected by a detector element along a direction of said ray. The image value itself is derived by A/D conversion via suitable circuitry from signals at said detector element of an X-ray detector. Although in other imaging modalities, this "signal chain" and the detector technology used may differ, the general principle remains that each image value represents a degree or level of interaction of a subject to be imaged with an interrogating signal. Interrogating signal is for instance the x-ray radiation, but may also be ultrasound or nuclear radiation depending on the imaging modality used.

The totality of imaged values, in particularly their variations across the detected image data, gives rise to contrast which encoded image structures. These image structures represent aspects of the imaged subject. These structures include plateaus of relatively homogeneous imaging values and, more interestingly, edges between those plateaus. The edges carry important image information as these confer, for instance, anatomical details to the viewer such as the surface or boundaries of an organ, for instance, a lung or liver or any other region of interest in an animate or inanimate object. The interrogating signal used by the acquiring imaging apparatus IM may be penetrating such as an x-ray but this is not necessarily so in all embodiments, as optical imaging with visible or invisible light is also envisaged herein.

In one embodiment, the proposed imaging system facilitates an important task frequently faced in image processing, namely that of registration. In (image) registration one wishes to establish a correspondence between two (or more) input images, say images A, B. Again for simplicity we will restrict the following to the consideration of two images with the understanding that it can be applied to more than two images. More particularly, in registration one wishes to find corresponding image structures in the two images. For instance, the boundary of the very same organ may be represented in the two images differently. This may be the case because the organ itself changed in shape or location whilst the two images were acquired at different acquisition times, or because the imaging modality was different. Image registration therefore is essentially a tool with which a user can easier "re-find" the same structure in the two images.

Turning now in more detail to the registration functionality of the imaging processing system, a registration problem can be defined as that of finding a transformation T from "source image", say image A to a "target image", say image B. The designations "target" or "source" image are entirely arbitrary and may be specified by the user. The transformation, once found, allows transforming A into B, that is T applied to A yield B, in short T(A)=B. Exact correspondence however will not be usually achieved as a matter of reality and one wishes to find at least a transformation T which approximates the target image in an optimal sense definable by a suitable measure. As an illustration, if the same modality is used, the correspondence may be defined as |T(A)−B| in terms of differences. However, it is understood that a more general approach (such as mutual information etc.) is required when different modalities are used because a simple taking of differences may then not be possible.

In other words, image registration can be formulated as an optimization problem where one wishes to compute the registration transformation T as a registration result from the given image data A,B (with x denoting a particular image location) by optimizing an objective function sometimes called a cost function. The end result T is then a transformation which minimizes or maximizes the objective function. In the following, the optimization problem is formulated as a minimization problem where one wishes to minimize cost but this is understood not to limit the following as maximization problems are also envisaged herein where the task is to maximize the objective function which in this context is then no longer referred to a cost function but as a "utility" function.

The optimization problem can often be translated into an iteration algorithm. This can be done by applying numerical techniques such as conjugate gradients or Newton-Raphson or others to arrive at an iterative procedure which, given an initial estimate $T^0$ for the registration transformation, iterates through one or more intermediate transformations $T^{N-j}$ until one arrives at the final result $T^N$. The number of iterations j (which can easily run into the hundreds or thousands) will in general depend on the accuracy one wishes to achieve. In other instances one may simply abort iterations after a pre-set number of iterations have been performed.

More particularly image registration may be formulated as iteratively minimizing a joint sum of so called "internal forces" and "external forces". Conceptually, the external forces result from a chosen similarity measure (e.g., sum of squared Differences, (local) cross-correlation, mutual information, normalized gradient fields) and are therefore based on image-based features (intensities, edges, etc.).

On the other hand, the internal forces are linked to a regularization term (or "deformation model") which, in a more simple setting, penalizes the spatial gradient of the displacement or incorporates more complex terms, e.g. from a physically motivated elasticity model. Starting with an initial deformation (e.g., zero displacement), in each iteration step the joint sum of internal and external forces is decreased. Convergence is reached if internal and external forces are in equilibrium state, that is, when an equilibrium point has been reached. Because the cost function is made up from both components, external and internal, the optimization task is one of negotiating between the two (or more) criteria: i) the similarity (external forces) of the solution ($T^j$) with respect to the "input data" as per the images A,B and ii) to what extent the solution ($T^j$) is to confirm with desirable properties such as smoothness etc. as defined by the internal forces component(s) of the cost function.

However, in registration tasks of the above formulation, image artifacts or pathological changes can disturb the equilibrium point, resulting in non-realistically large local deformations being proposed during the iteration. For example, a streak artifact (caused by metals or contrast agent) with high image intensities and sharp edges can result in large external forces. Similarly, missing image structures (e.g., due to signal extinction or pathological changes) can result in a deformation showing local compression or even folding.

In more detail and referring to the registration functionality in the image processing system IPS, it is proposed to automatically detect and suppress unwanted local deformations incurred during the iterations to so achieve better robustness against factors that conspire to disturb convergence properties of an iterative registration algorithm. Specifically the image processing system includes an input port IN where the two or more input images A, B to be registered are received. The images can be received directly from the imaging modality IM or from a plurality of different image modalities but may also be retrieved from databases or other storage facilities for images such as PACS (picture archiving and communication system) as used in hospital information systems (HIS). The input images A, B are then passed on to an iterative solver SOLV-REG which implements an iterative registration transformation based on the cost function. The solver iterates from the initial transformation $T^0$ through one or more intermediate registrations $T^{N-j}$ to the final transformation $T^N$ once a sufficient level of convergence has been reached. The iterative solver is driven by the optimization function $f$. The optimization function $f$ is a sum of at least two functional components. One component is a regularizer term whereas the other component D is a similarity measure.

More formally, we assume herein in one embodiment a registration approach in which the sum of (at least) two functionals is to be minimized, of which one functional D corresponds to a similarity measure and another functional S corresponds to a regularizing term, $$D[u]+S[u]\to\min \quad (1)$$

where u ranges over a space of registration transformations T. u is a deformation vector field, in terms of which the transformation T can be described. This is because a closed analytic representation for T in terms of a "formula" is not usually available. The terms T and u can be used interchangeably herein as one defines the other. Optimizing the joint sum of these two functionals D, S as the cost function can then be shown to be equivalent to iteratively solving a system of partial differential equations (with x indicating image location):

$$Lu^{(i+1)}(x)=u^{(i)}(x)+f(u^{(i)}(x)) \quad (2)$$

with appropriate boundary conditions, and i the iteration step. The update or optimization function (2) can be derived from the optimization problem (1) by applying calculus methods and the PDF problem (2) can be solved by finite difference methods, by finite element methods, by finite volume methods or by a mixture of these or by other methods where (2) is recast as a system of matrix equations.

The update function (2) tells us how to iterate through the space of possible transformations. L defines a differential operator resulting from the regularizer S, u(i) defines the deformation vector field (DVF) computed in iteration step i and $f$ defines a function resulting from the similarity measure D. The regularization term (represented by L) is linked to the inner forces, the similarity measure (represented by the force term $f$) is linked to the external forces. As can be seen, the structure of the cost function (1) is assumed herein to be such that it is functionally separable into distinct functional components D, S for the external and internal forces and it is further assumed herein that the update function (2) derived from (1) "inherits" this separability to likewise yield the two related functional components $f$,L associated with D,S, respectively. As an explanatory remark, it will be understood herein that the cost function and also the update function may of course include more functional components than those for the internal and external forces to so account for other optimization criteria.

The similarity measure measures how the target image differs from the intermediate results produced during the iteration. More specifically during the iteration the intermediate results $T^{N-j}$ are repeatedly applied to the source image A and then the similarity of this image $T^{N-j}$ (A) and the target image B is evaluated by a suitable measure. Suitable similarity measures are least squares of the difference between A and $T^{N-j}$ (A), or others, in particular similarity measures that are not based on difference operations.

After each or (any m-th (m>2) iterations (or at random)), an (image) volume element monitor IVM operates to monitor how a volume of an image element at a given location x changes when the intermediate transformations $T^{N-j}$ are applied during the iteration cycles. Preferably the volume element monitor IVM operates to monitor each and every image location x, but embodiments are envisaged where monitoring is restricted to a true sub-set of image location. These image locations may be user definable.

An (image) volume element evaluator IVE receives the monitoring result from the image volume element monitor IVM and assesses or evaluates the volume change of the volume element by comparing the monitored change per image location x against a pre-set condition. In particular, there is voxel-wise or pixel-wise automatic monitoring of volume changes of respective neighborhoods around x during the image registration process. Each image element is defined by such a neighborhood. For instance, if for a certain voxel, the volume change falls outside a trust interval or other acceptance condition this is flagged up for this voxel location x. For instance, a trust interval can be defined by requiring that for all volume changes there is a permissible compression factor <2 and an expansion by less than 100%).

When the image evaluator IVE finds that, for a given location x, the so monitored change violates said conditions, a flag signal is passed on to a corrector module C. Upon receipt of this signal, the corrector module operates to relatively mitigate (that is, fully or at least partly disable or suppress), for the given image element location x, the functional component in the update function that relates functionally to the similarity measure D. This similarity measure component in the update function is designated as $f$ in (2). In particular, the similarity measure component remains then ineffective for this image location x for the remainder of the iterations. In yet other words, the iteration formula for this pixel is modified so as to exclude the functional component that relates to the similarity measure from the cost function. In yet other words the optimization problem for this pixel has been locally changed as now, for this pixel x, no similarity measure is considered.

The automatic (relative) mitigation by full or partial disablement or suppression can be realized by multiplying the term $f$ (that represents the external forces) in (2) voxel-wise with a mask matrix or mask image M and rows and columns in M correspond to image locations x in the image B. The mask image M is initialized with "1s" everywhere and the 1s are set to 0 for any image location x, for which a flag is set during the automatic monitoring step. In other words, artifact-induced "large" external forces are relatively mitigated (or in some embodiments are turned off completely) and in the remaining process of image registration a new equilibrium point is found. The new equilibrium point represents a scenario where the artifact or pathological change is absent. More formally then, it is proposed herein to modify (2) into:

$$Lu^{(i+1)}(x)=u^{(i)}(x)+M(x)f(u^{(i)}(x)) \quad (3)$$

with M being the mask matrix M, selectively relatively mitigating by suppressing or disabling the functional action of update function component f. Preferably, the action of the functional component f is fully suppressed but in some application scenarios a mere mitigation by multiplication of a small factor (<<1) may be sufficient. It should be understood that the formulations of the update function in (2), (3) is merely exemplary as the formulation corresponds to a "optimize first. Then discretize" approach. In this approach, one optimizes the cost function first by whatever method to obtain at algorithmic instructions in terms of an update function and this is then discretized to finally arrive at a computer-implementable form for the update function. But the inverse approach "discretize first and then optimize" is also envisaged herein in alternative embodiments and this approach may lead, for the same cost function, to a completely different form for (2) and (3).

At the conclusion of the iteration, the final registration result, that is the final transformation $T^N$ ($=u^N$), is output at output port OUT. The transformations considered herein are of the non-rigid, non-affine types to allow accounting for shearing, compression or expansion changes at the image element locations x. The transformation T itself is usually described in terms of a deformation vector field (DVF) which in turn can be described in a suitable functional expression such as a collection of vectors or as one or more matrices or any other data structure. This functional expression for the final registration transformation result $T^N$ can be applied to the source image A to so register A "onto" B. In other words, $T^N(A)$ is an estimate for B. Depending on the quality of the registration, it is expected for $T^N(A)$ to largely correspond visually to the target image B.

Figure 2:
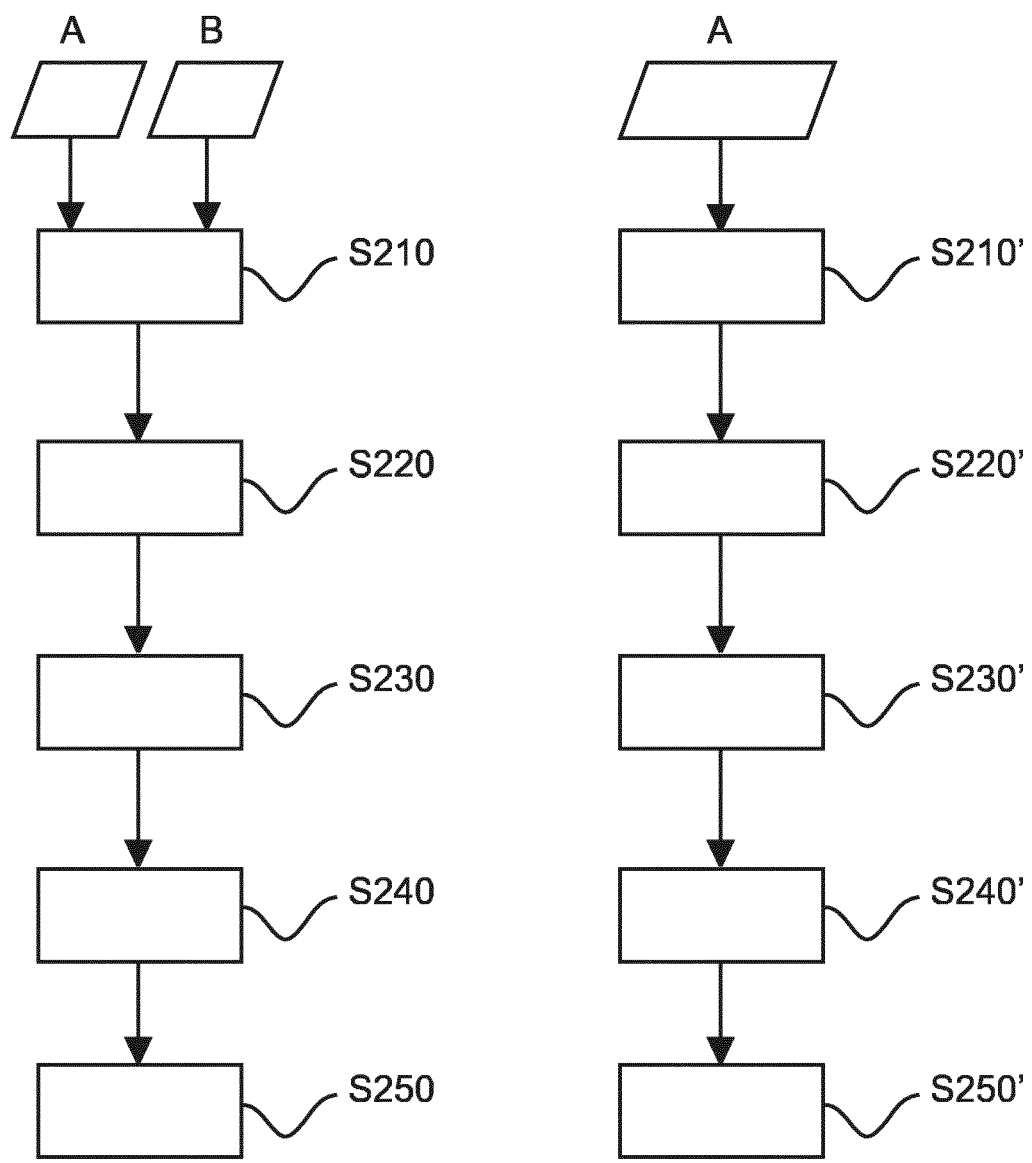
FIG. 2 shows a flow chart of an image processing method.

Reference is now made to the flow chart on the left in FIG. 2, where the operation of the iterative registration algorithm is explained in more detail. It will be understood herein that the following explanation of the different steps of the registration method is not necessarily tied to the architecture as per FIG. 2 and the following steps may therefore be understood by those schooled in the art to constitute a teaching in its own right.

At step S210 the two or more images A, B for registration are received.

Step S220 includes iteratively solving for a final registration transformation by iterating through one or more intermediate results towards the final result $T^N$. The iterations are driven by (1) and are implemented as (3). The iteration is "driven" in a sense that the iteration formula seeks to improve the cost function. In other words, a next registration result $T^1$ does not incur more cost (and in fact will generally decrease the cost) than does a previous registration result $T^k$ (l>k). According to one embodiment the iterative solving towards the registration result can be implemented as follows per (3) above.

In step S230 are monitored the image volume element changes at the given image location x. This includes, in general, for each monitored image location the definition of a neighborhood (a sphere, or cube, etc.) of a suitable size which size may be user-adjustable. When the intermediate transformation registration results are applied during the iteration cycles to those image locations x, a respective image volume change of a respective volume element at said location x will occur, and these local volume changes can be described, per x, by a vector field. These vector fields can describe local volume changes of the respective (per x) neighborhoods such as compression or expansion, or shearing and these changes can be quantified by suitable metrics such as a scale factor or a cross-product value to quantify the amount of shearing etc. In other words, the metric and the geometrical tools used for their definition will ultimately depend on the nature of the monitored change.

At step S240 the evaluations per x at step S230 are established by comparing numerically the quantified changes against pre-defined (and possibly user adjustable) threshold values. More particularly, in case of small or moderate deformations, after convergence, we have M≡1 as no suppression is necessary. However in case of artifacts or pathological changes resulting in a temporary large local volume change, the mask M is set locally to 0, meaning that the overall functional to be optimized is modified. This, in turn, zeroes the force term $f$ at this local position x for the current iteration step i and for all following iteration steps j>i. Mathematically spoken, with the next iteration step a new optimization process is started with the current deformation vector field $u^{(i)}$ as starting point. Since M(x)=0 for all previously monitored locations x with untrustworthily high volume change, the external forces for those image element locations x are cancelled. And this means that the internal forces are the only "active players" in the iterative optimization at said location x. Only the internal forces (and possible other functional components) are being accounted for in the optimization whilst the external forces are no longer accounted for. Optimizing at the given location x based on the internal force (but not on the external force) will lead to a smoothly interpolated deformation around this image location x.

At step S250, an effect of the similarity measure is relatively mitigated for subsequent iterations at the considered image location. The effect is relatively mitigated on the condition that the evaluation at step S240 has established that the pre-set acceptance condition has been violated. The effect of the similarity measure can be relatively mitigated by disabling a corresponding functional component in the iterative algorithm or update function derived from the cost function. Relative mitigation can be achieved by mitigating the similarity component whilst the regularizer term remains unaffected. Alternatively and inverse to this, the regularizer can be amplified whilst the similarity measure component remains unaffected. As a further variant, it is also envisaged to mitigate the similarity measure component and to amplify the regularizer component to render the relative mitigation more pronounced.

Turing first the embodiment where the similarity measure component is mitigated by a disablement or suppression or down-weighting operation, this can be implemented by defining a mask matrix which is initially populated with unit elements. Each entry, or "flag", corresponds to an image location in the image to be registered so the mask matrix M is either 2D or 3D depending on the dimensionality of the images. If the evaluation revealed that the acceptance condition has been violated, the respective location in the mask matrix is changed to zero. The update function for the iterations is then multiplied with this matrix so that the similarity term is cancelled for the given location, because of a zero entry at the corresponding location in the mask matrix M. It will be understood that the external forces component to be mitigated is not necessarily integrated into a single functional unit (such as schematically denoted as $f$ in (2)) but the external forces component may be spread among more than one functional sub-components ($f=f_1, f_2, f_3, \ldots$) in the update function. In this case then, the mask matrix comprises a plurality of matrices $M=M_1, M_2, M_3, \ldots$ each acting on the respective components $f_1, f_2, f_3$ to perform the mitigation action on at least some, preferably all, sub-components. As mentioned above, the cost function and hence the update function may include components other than those for external and internal forces to so account for other optimization criteria and these other criteria are not affected by the proposed mitigation action. That is, the mitigation action is envisaged herein to act solely on the external forces components (of the update function) that stem from the similarity measure in the cost function.

Eq (3) above can be expressed by a discretized systems of partial differential equations (PDEs). In the following, a pseudo-code is presented which forms one embodiment for the above introduced method for image processing. More particularly, according to one embodiment, the method can be implemented as:

```
set mask M(x) = 1 for all voxel positions x
for all i=1,2,... until convergence do
    compute u$^{(i)}$ by solving the system of PDEs
    compute the local volume change V(x):= det(Jac (x + u$^{(i)}$(x)))
    for all voxel positions x
        set M(x) = 0 if V(x) is outside a trust interval
end
``` where, in the first iteration step, $u^{(o)} \equiv 0$ (or any given, a-priori known, initial displacement). In the above, operator Jac(.) represents the Jacobian (a matrix that is) and det (.) is an operator that represents the taking of the determinant of the Jacobian matrix.

It is understood herein that the above pseudo-code is merely one among many embodiments to take the proposed method into effect and should not be construed as limiting what is described herein.

In an alternative embodiment, the relative mitigation of the effect of the similarity measure component can be achieved in a manner inverse to the above embodiments. In other words, the similarity measure component remains unaffected but instead it is the regularizer that is amplified or up-weighted relative to the similarity measure component. In this case, the mask M is rearranged in (3) to operate on the term L and not on the term f. Also, the pseudo code will need to be modified as the entries in M are now "1s" everywhere by default but are now set to factors >1 at image locations where the acceptance conditions are violated.

As mentioned, one may also combine these embodiments by using a respective mask matrix at $f$ and L. respectively to mitigate f and to amplify L to increase the effectiveness of the relative mitigation of $f$.

One possible application scenario for the proposed image processing method and the image processing system for registration could be described as follows: the self-correcting feature of the proposed method (that is, the automatic suppression of parts of the update function in response to changes at individual image locations during iterations) can be adapted in one embodiment to shear-sensitive respiratory motion estimation. This is because lungs are known to experience sliding motion during breathing at the fissures and the pleura. A state-of-the-art registration algorithm returns a deformation vector field where any potential shear across pleura or fissures is smoothed. Automatic shear detection can be used to locally reduce the weight of the internal forces, thus to allowing locally for sliding whilst still fulfilling globally the physical model as prescribed by the regularization term. The automatic shear monitoring can be implemented via forming the cross-product of the local deformation vector field.

As briefly indicated earlier the image processing system IPS may be arranged to perform segmentation instead of the previously described registration. Although segmentation and registration are alternative operations, embodiments may be envisaged herein where both functionalities, registration and segmentation, are integrated in the same image processing system and the user can select which operation—segmentation or registration—is to be performed.

Referring briefly back to FIG. 1, in the context of segmentation, the image processing system IPS includes instead of the registration solver SOLV-REG, an iterative segmentation solver SOLV-SEG.

As is the case for the registration application, the segmentation task can likewise be formulated in terms of an optimization problem of a cost function with two functional components. Therefore, the above described principles in relation to registration where certain functional components are disabled during the iteration based on monitoring of individual image values or image elements per image location can then also be applied to image segmentation.

More specifically, in model based segmentation one wishes to use a geometrical model, such as mesh model, which represents the rough shape of the object one wishes to segment for. This model is then geometrically changed into different states such as compression, translation etc., to fit to image structures in the image to be segmented. The task is then to find the best image structure, that is, the one that best fits the model and at the same time comprises the right image features, for instance has edges at the right location. This can be formulated again as a joint optimization function. That is, in model-based segmentation a mesh-based shape representation is iteratively adapted to, e.g., an organ surface by jointly optimizing external forces (based on image features) and internal forces (mesh regularization). Large local compression, expansion, bending or folding of the mesh can be detected and employed for local suppression of the external forces.

The iterative segmentation for the SOLV-SEG then iterates for segmentation model at an initial geometrical state through intermediate states of said model towards the final state of the model. The final state of the model in this context means a position in the image and a deformation which outlines correctly the image structure to be segmented for. For instance, in cardiac imagery, one may wish to segment for an image structure that represents an implanted heart valve. Because the type of heart valve is known, its expected shape and size, etc. are also known. This constitutes then the model which is being fitted (stretched, compressed or otherwise "permissibly" distorted) to the cardiac image to so find the image structure representative of the valve.

After the iteration concludes the deformed (and possibly shifted model) can then be overlaid onto the input image to visually outline the valve shape.

In correspondence to the image registration embodiment discussed before at FIG. 1 and (left part of) FIG. 2, in the segmentation embodiment of the image processing system IPS this now includes a model monitor MM (instead of IVM) that monitors the geometrical changes to which the initial model is subjected to during the iterations. In place of the image evaluator IVE, there is then a model geometry change evaluator MCE. This is configured to evaluate the geometry changes and to compare these to acceptance conditions. The acceptance conditions define the sort of permissible geometrical changes that are accepted in the present segmentation context. If, during the monitoring, it emerges that an impermissible model change is being proposed as the iteration unfolds, a corrector is notified about this and the image feature component in the update function is relatively and selectively mitigated for the respective image location as described above in the registration context. More particularly, a component in the update function is disabled which corresponds to the image feature component in the cost function from which the update function has been derived. Put differently, preference is given to the model component over the image feature component during the iterations.

Referring now back to FIG. 2, but now to the right hand side thereof, this shows a flow chart for an image processing method for the purposes of model based segmentation.

At step S210', the input image A to be segmented is received.

At step S220', an iterative segmentation algorithm is performed to solve for final registration segmentation results. During the course of this there is iteration through one or more intermediate geometrical states of an initial model. As earlier, in the context of registration the iterative solver is driven by an optimization function for the segmentation task. The optimization function comprises at least one (preferably two) functional components one of which measures image features in the image during the iteration. These features are measured at different locations relative to the current geometrical state (position, compression, expansion etc.) of the model. In this way it is attempted to reconcile the model with the surrounding image information. More specifically on the one hand the model's boundary should coincide with edge structures in the image and this is established by using the image feature component in the objective function. On the other hand, the geometrical changes that are to be applied to the model must not violate certain regularization conditions. For example, unrealistic geometrical changes such as breaking the model into two are prohibited. In other words, geometrical requirements need also to be observed and this is expressed by the regularization term which forms the second functional component. The method as proposed herein then gives preference to observing the regularization requirements and to abandoning the image feature contribution, if there is a conflict.

More particularly, at step S230' geometrical changes which the model undergoes are monitored. The geometrical state changes include volume changes and/or topological considerations such as connectedness and/or other measures.

At step S240' those changes are compared against acceptance conditions for those geometrical state changes. For instance, these may include a maximum amount of deformation (shearing etc), a maximum amount of allowable volume change (as in the registration embodiment discussed above) and/or whether connectedness is preserved, or any other suitable, quantifiable geometric condition that is capable of defining the geometrical state.

At step S250' the image feature component or the influence thereof in the iterative update function is relatively mitigated if at the previous step S240' it is found that those conditions have been violated. After a sufficient number of iterations, a final result is obtained in the form of the current geometrical state of the model. This includes its shape and position relative to the image co-ordinate system. The shape and position of the imaging model after conclusion of iterations then defines the segmentation. In other words all image elements inside the image portion circumscribed by the model in its current geometrical state (at the conclusion of the iterations), are then by definition considered to constitute the image structure of interest. The notion of relative mitigation is analogous as explained earlier in the registration embodiment.

In the embodiments as per FIG. 2 for registration or segmentation, alternative embodiments are envisaged where the cost function comprises only one (a single) functional component, namely, the similarity term and the image feature term, respectively. In particular in this case, the mitigation is applied to this single term only. In particular, the presence of the regularizer term, although preferred herein, is not mandatory for all embodiments. The registration accuracy evaluation system REG-EVAL briefly mentioned in connection with FIG. 1 is presented in more detail in FIG. 3.

The registration evaluator sub-system REG-EVAL as proposed herein allows estimation of the registration accuracy automatically and the registration accuracy is evaluated per image element. In other words, the registration accuracy is quantified at individual pixel or voxel positions and can hence be shown for all image elements of the image, although the processing of only parts of the image or sub-sets thereof by the proposed evaluator are also envisaged herein in some embodiments. The output of the evaluator is a registration accuracy map, that is, an image having the same dimensions as the registered onto image T(A), with each image pixel or voxel in this map indicating the accuracy in a suitable dimension such as millimeters, centimeters or microns.

The construction of the proposed image evaluator, which will be explained in more detail below, is such that its response is sensitive at image regions which a human observer is likely to choose to estimate the accuracy of the registration. More particularly, edge like structures (such as vessel, organ or tumor delineations,) are image locations where, by construction, the proposed evaluator will return a non-zero response whereas in regions with homogeneous image intensities (at which even a human observer can be expected to have difficulties judging accuracy) will return a zero response. More particularly, a non-zero response is returned if a mismatch or a non-optimal matching between edges has been estimated. A zero value as response is expected when (i) registration for this image element is exact or when (2) this is a region of homogeneous intensities. As used herein the notion of "zero-response" as used herein designate response that represents the information that no mismatch or registration error has been found at a given location.

Yet, more particularly, let B and T(A) be the two images under comparison—with B being the target image, for instance the follow-up image, and image T(A) a deformed baseline image after registration onto the source image A. These images are received at input port IN. It is then the task to quantify per image element to what extent T(A) is similar to B. In general, respective image edges in B and T(A) may not run at the same locations in the two images B,T(A), due to inaccuracies and it is precisely these inaccuracies to which the proposed evaluators are responsive to. This is achieved as follows: the proposed evaluator uses a series of edge filters EF that are parameterized by some parameter, say $\sigma^2$. The image filters, such as edge detection filters, Sobel filters or second image derivative operators or others will in general return a response at an edge image structure. This response can be visualized graphically as a response surface usually having a peak characteristic at the image structure of interest. The individual edge filters EF in the family vary in their response characteristic which is measured by the parameter $\sigma^2$. For instance, in one embodiment the response peak width of the respective peaks differ. More specifically, and in one embodiment, the edge filters are second order image derivatives having a Gaussian kernel and $\sigma^2$ corresponds to the variance of the Gaussian distribution used in the kernel. This then amounts to different peaks widths of the returned peaks upon variation of the parameter $\sigma^2$. A test module TE operates to apply each of the edge filters EF in the series $EF_{\sigma 2}$ to the two input images B and T(A), respectively. It so produces a plurality of response surface (or response array(s)) pairs where there is a respective response surface for input image B and T(A), for each edge filter EF. Image derivatives of higher than second order may be used instead or in addition to second order derivatives in some embodiments.

Very broadly, the plurality of response surface pairs is then combined by a combiner $\Sigma$ into a combined response surface. This combined response surface is so configured that it varies non-monotonically with the filter parameter $\sigma^2$. An extremal value finder SE then operates to find an extremal value as a function of the filter parameter, in the combined response surface. It will be understood that, as a matter of practical reality, only a finite number of filter elements (and hence filter parameters) is used and the combined response surface is therefore known exactly only at number of discrete sample points. An interpolation is therefore carried out to construct the continuous surface for those control points and it is this continuous surface which is then examined for its extremal point. In other words the filter parameter value so defined may hence not necessarily correspond to any of the initial plurality edge filters used to obtain the filter response surfaces.

The output port OUT outputs the (possibly interpolated) filter parameter at which the extremal value in the combined response surface is assumed. This operation is repeated for each image pixel or, more generally image element, to yield different filter parameters. Each of the filter parameters so returned is then a measure for the registration accuracy at the respective image location.

The individual parameters' values $\sigma^2$ produced at output port OUT, which may be referred to as accuracy score values, can then be visualized on a display device MT by operation of a visualizer VIS.

More specifically an embodiment of the proposed evaluator will now be described in broad terms and will later be described in more detail with reference to flow chart at FIG. 4. Broadly, mis-alignment of image edges is analyzed by computing second order derivatives in T(A) and B. An image edge is represented by a response surface in form of a positive peak and a negative peak in the second order derivative image. More particularly, the image edge is presented by a gradient vector where at least one of its components exhibits a response surface with said positive and negative peak. The spatial distance between the positive and the negative peak depends on the derivative kernel the larger e.g., standard deviation of the Gaussian distribution is chosen, the larger the spatial distance between the two peaks. Assuming a mis-alignment of an image edge in T(A) and B, for a certain size of the derivative kernel the negative peak of the second order derivative from image T(A) matches the positive peak of the second order derivative from image B. If mis-alignment is smaller (larger), then the derivative kernel will need to be smaller (larger) in order to match the two peaks. The goodness of matching of the peaks can be measured by computing the scalar product of the second order derivatives of A and B, followed by thresholding and integration. The resulting value is minimal if the peaks are at the same spatial position. Computing the goodness of matching for a variety of derivative kernel sizes allows for determining that kernel size which minimizes the scalar product and therefore allows for automatically determining the spatial distance between the misaligned image edge in image T(A) and image B.

The computed spatial distance (or registration error or accuracy estimation) can be color-coded and overlaid onto image B and/or (after transformation) onto image A.

It will be appreciated that in the example just described, the combined response surface is formed by applying the scalar product and then integrating the scalar product's values across image locations x and thresholding with respect to zero or any other reference baseline value. Only negative scalar product values are added up. The physical meaning of the combined response surface in this case may then be taken to be the spatial location between the respective peaks which is expressed as the goodness of matching between the peaks.

Figure 3:
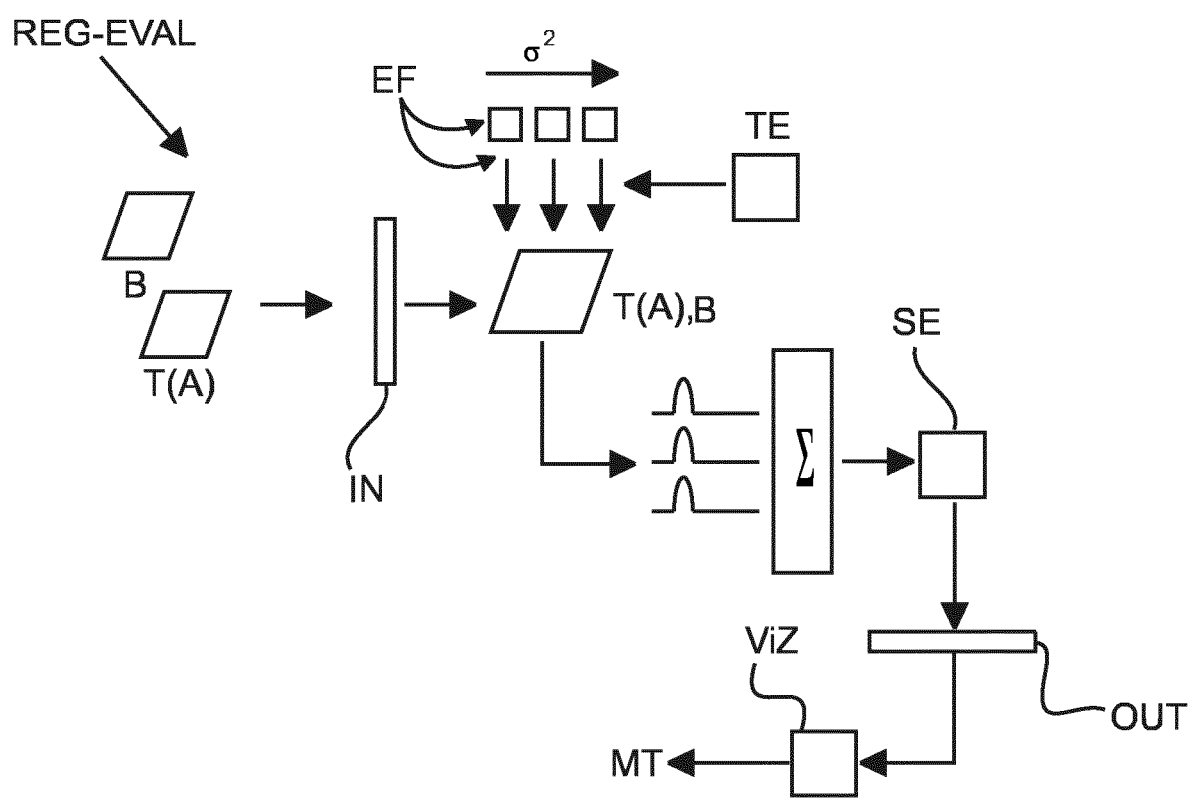
FIG. 3 shows in more detail part of the image processing system as per FIG. 1.
Figure 4:
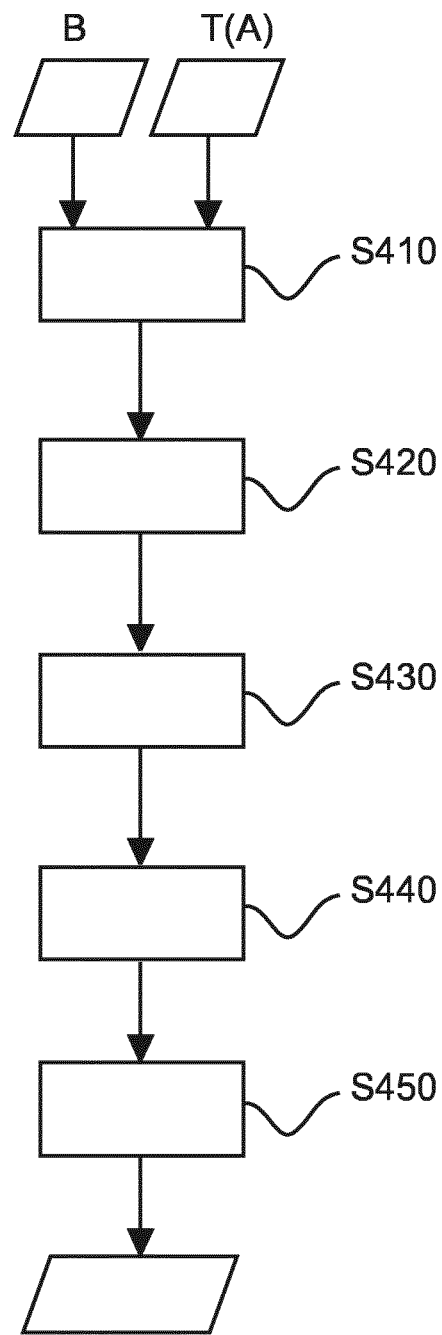
FIG. 4 shows a second processing method.

Reference is now made to flow chart FIG. 4 where an imaging processing method for the purpose of registration accuracy quantification is explained. Again, as above in flow charts of FIG. 2, the explained method steps and embodiments are not necessarily tied to the architecture shown in FIG. 3 and the following method steps constitute teaching in their own right.

At step S410 the two (or more) input images T(A) and B are received. The images are received either direct from the imaging apparatus or are retrieved on user or protocol request from a storage facility, such as a PACS or any other memory or database system.

At step S420 a series of parameterized edge detection filters are applied, respectively, to the two input images. In this manner a parameterized series of pairs of different filter responses, per input image and filter parameter is produced. The edge detection filters are parameterized by a filter parameter. The parameter relates to the characteristic of the respective edge filter, such as a width of a peak response, etc.

At step S430 the information in the response surface pairs as per the two input images is consolidated into a combined response surface in a combination operation. This combined response or combined surface is constructed to vary non-monotonically as a function of the filter parameter.

At step S440 an extremal value of the combined response surface as function of the filter parameter is established. A filter parameter associated with this extremal value from the combined response surface is then returned. This parameter may be obtained by interpolation from existing parameters from the set of edge filters.

The metric for quantifying the registration accuracy is then based on this so returned filter parameter which may be different for different image locations. In other words the previous steps are to be repeated for each and every image element in the images, or for a sub-set thereof. The filter parameter can be visualized directly on the screen or can be converted into a length dimension such as millimeters or microns.

In the following, an embodiment of the above described method for image registration quantification will now be described at the example of test image data. An example of such test image data is shown in panes A) and B) of FIG. 5. For ease of representation test data is taken to be two dimensional with the horizontal x and vertical y axis in FIG. 5 indicating columns i and rows j, respectively. The test data is artificial in a sense that there is only a single edge running vertically through the image, albeit at different locations, thus representing registration inaccuracy.

Figure 6:
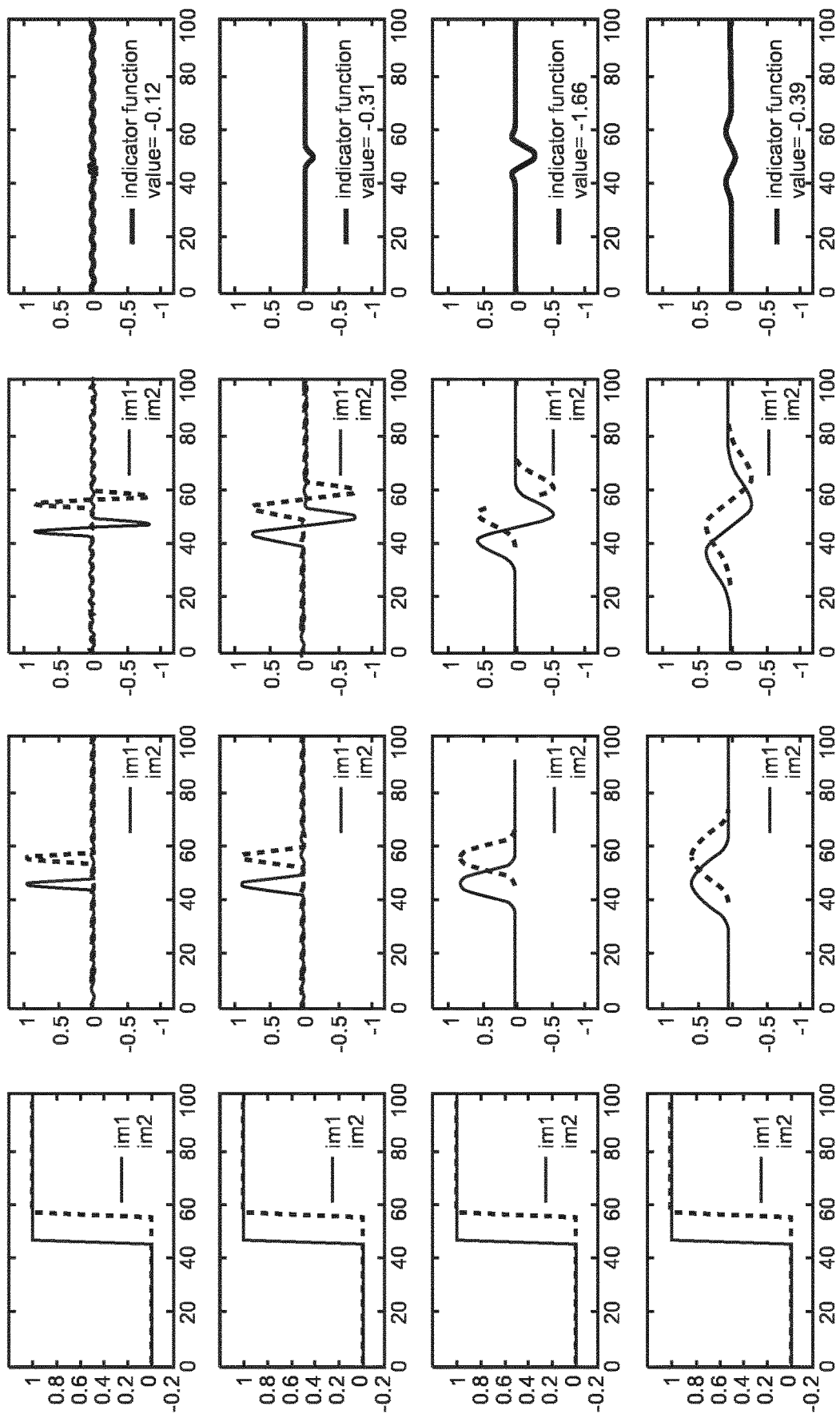
FIG. 6 shows diagrams of numerical data generated by the method as per flow chart 4 when applied to test data as per FIG. 5.

The numerical data obtained in the course of execution of the proposed method is shown in the collection of diagrams of FIG. 6. Each row (four are shown in FIG. 6) corresponds to a specific filter parameter $\sigma^2$ for the Gaussian case, specifically $\sigma^2=4$, 6, 8 and 10, respectively from top to bottom. To further simplify the graphical explanation of the method steps only one dimensional presentation along the x axis is shown in the diagrams. In consequence, the response "surface" and the combined response "surface" are curves in 1D for the purposes of illustration in FIGS. 6,7.

Figure 7:
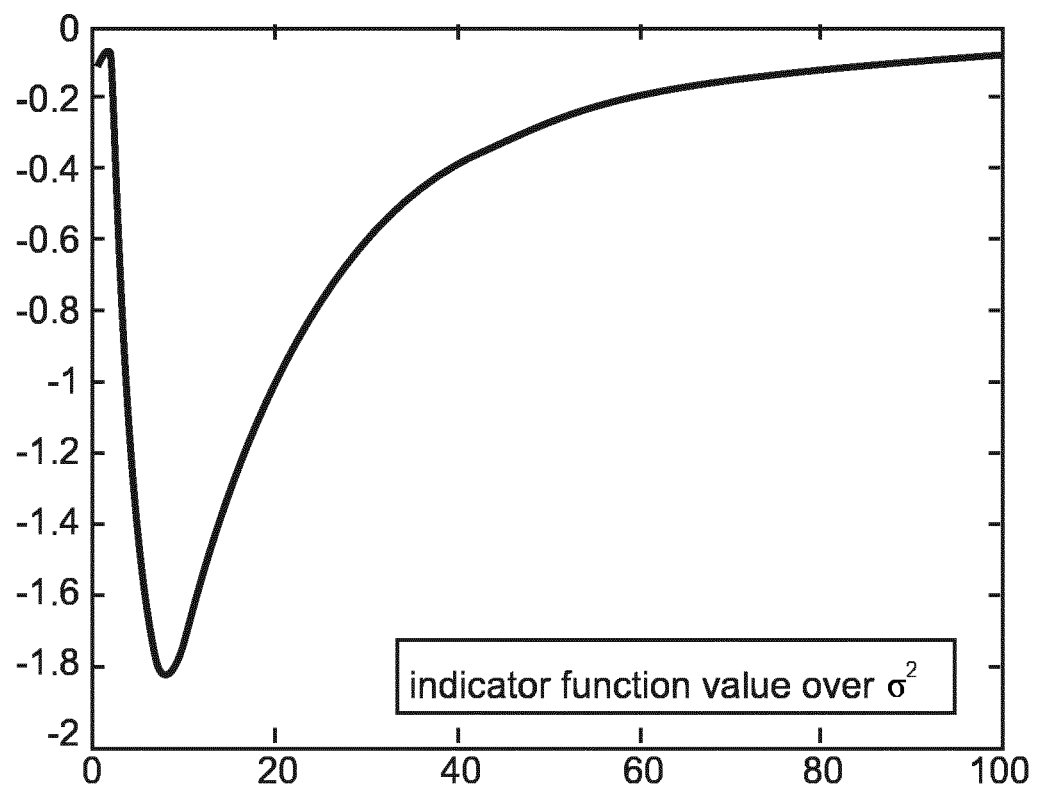
FIG. 7 shows further numerical data generated by application of the method of flow chart FIG. 4 to image data as per FIG. 5.

The diagrams in the first column of FIG. 6 are identical and merely show a profile across the two test input images, with the edge showing at different image locations. The second and third columns (from left to right) show the respective construction of the second order derivative. For ease of graphical exposition, the second column shows only the X component of the first derivative and the third column shows only the X component of the pure partials of the second order derivative operator. The last column shows the point-wise taking of scalar products and this operation is a part of forming the combined response function (also referred to as "indicator function") shown in FIG. 7. Specifically, the combined response surface in FIG. 7 is obtained from the scalar products by integration (along the x axis) after thresholding with respect to zero. The scalar product can be understood as merely one embodiment for a point-wise operation to collapse the spatial information into a single weight along (each) spatial dimension through the image location under consideration. The weights are then summed up, preferably along each spatial dimension. In one embodiment, as in the scalar product embodiments, the weights are signed to implement a summing with thresholding. These steps are then repeated for each image location.

The extremal value viewed as a function over the filter parameter $\sigma^2$ is seen to be in the order of 10 and it is this value that is returned as the registration accuracy quantification in this example at the given image location. In other words, for a value for $\sigma^2$ of about 10, the negative peak for image A) in FIG. 5 (shown in solid lines in FIG. 6, $3^{rd}$ column, $3^{rd}$ row) and the positive peak for image B) in FIG. 5 (shown in dashed lines) occur at about the same voxel position.

It can be seen that for homogeneous regions a "zero" response will be returned, as the scalar product is zero if there is no "overlap" of the two peaks (shown as solid and dashed lines, respectively for the two input images). By construction therefore the proposed method will yield a non-trivial response only at image locations where edges are sufficiently close nearby, that is, where an at least partial overlap can be achieved by varying the widths of peaks in the response surfaces Therefore, if we examine the third column in FIG. 6 it will be seen that only due to a relative close spatial distance between the peaks one can establish an overlap between the peaks by varying the filter parameter.

With continued reference to FIG. 6, the step for forming the combined response curve based on the second order edge detection can be implemented in one embodiment as follows:

For better understanding we first assume the case of images with a single edge structure. Then, for two given input images A and B (for notational convenience we drop the earlier notation T(A) and now only refer to this image as "image A"), we propose the following subroutine to compute the edge response curve for the case of the second order image derivate operator EF, parameterized by $\sigma^2$.

Initially, the first-order general derivative with respect to x, y, and z for both input images A, B is computed. This results in intermediary images $A_x, A_y, A_z, B_x, B_y$, and $B_z$, i.e., in mappings from voxel position (i, j, k) into the set of real numbers. Preferably normalization is performed on the first-order general derivatives, resulting in images $A_x'', A_y'', A_z'', B_x'', B_y''$, and $B_z''$. FIG. 6, 2nd column, is an example of $A_x''$ and $B_x''$ (only the x-component is shown in FIG. 6).

Next, from $A_x''$ and $B_x''$ one computes the second-order general derivatives with respect to xx, xy, and xz for both images, resulting in $A_{xx}, A_{xy}, A_{xz}, B_{xx}, B_{xy}$, and $B_{xz}$. Again, we normalize these and store $A_{xx}''$ and $B_{xx}''$. FIG. 6, 3rd column is a visualization of the x-component only.

Next, from $A_y''$ and $B_y''$ one computes the second-order general derivatives with respect to yx, yy, and yz for both images, resulting in $A_{yx}, A_{yy}, A_{yz}, B_{yx}, B_{yy}$, and $B_{yz}$. Again we normalize and store $A_{yy}''$ and $B_{yy}''$.

Next from $A_z''$ and $B_z''$ we compute the second-order general derivatives with respect to zx, zy, and zz for both images, resulting in $A_{zx}, A_{zy}, A_{zz}, B_{zx}, B_{zy}$, and $B_{zz}$. Normalizing yields then $A_{zz}''$ and $B_{zz}''$ and these are then stored.

These operations then conclude the computation of the response curve for a given $\sigma^2$ and the above computations are repeated for a range of parameters $\sigma^2$.

The computation of the combined response curve then includes computing, for each voxel position (i,j,k), $S(i,j,k) := A_{xx}''*B_{xx}'' + A_{yy}''*B_{yy}'' + A_{zz}''*B_{zz}''$. Exemplary values for this are shown in FIG. 6, 4th column (again x-component only).

The computation of the combined response curve further includes summing up all values of S that are smaller than 0, and this result is stored as a summed value in a vector indicator-function $(\sigma^2)$ in association with $\sigma^2$ to so form the combined response function. One then determines the $\sigma^2$ for which the indicator-function is smallest (see FIG. 7 for an example). The optimal $\sigma$ is then stored, optionally together with its function value, in an output image at the current voxel position.

The normalization step allows making the filter response comparable even for imagery from different modalities. The normalization may or may not be applied at each stage of the image derivative computations, although applying the normalization at each stage, as explained above, is preferred. According to one embodiment, the normalization can be done as in E. Haber et al, "*Beyond Mutual Information: A Simple and Robust Alternative*", in "*Bildverarbeitung für die Medizin 2005*", Springer (2005), pp. 350-54.

Figure 5:
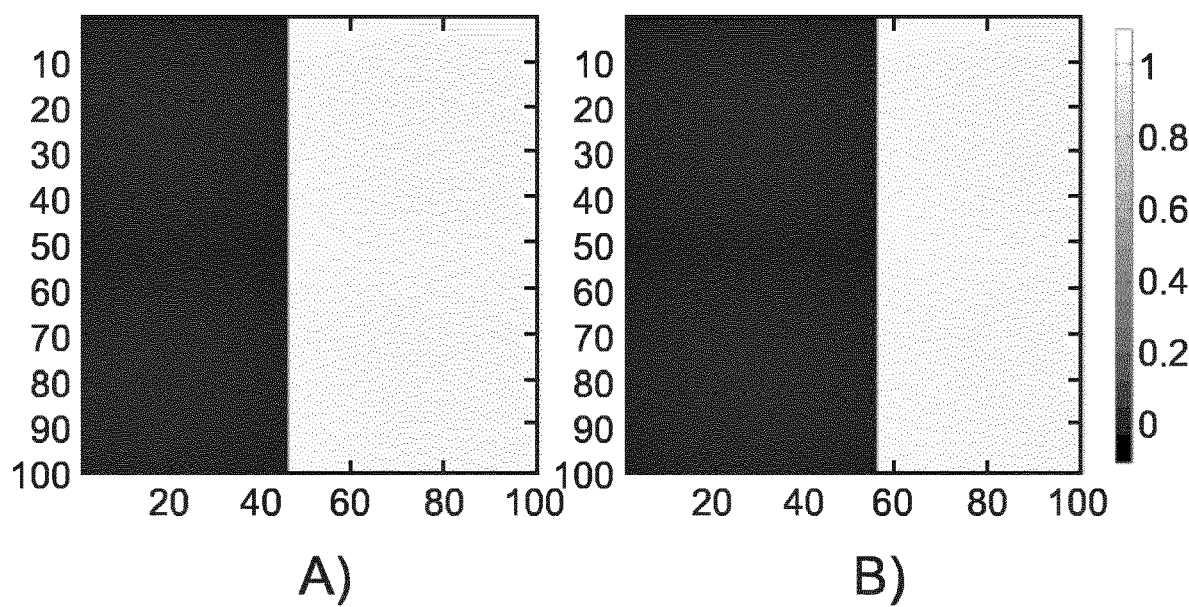
FIG. 5 shows exemplary test data to which the proposed method of FIG. 4 can be applied.

As mentioned, the above sub routine is applicable to images with a single (prominent) edge structure like in the test imagery in FIG. 5, A), B). For real-world imagery with more complex structures, the above sub-routine is applied to subsets of the input images and is then repeated preferably for all voxel positions.

Thus, the invention proposes for two given images A and B to define for each voxel position a sufficiently small neighborhood centered around the respective voxel position. In one embodiment a size of 21×21×21 is chosen but this is purely exemplary. The above described sub-routine is then executed, resulting in (i) an optimal $\sigma^2$ denoted as "$\sigma^2$-opt", and (ii) the function value of the combined response function for $\sigma^2$-opt denoted as "indicatorFunction($\sigma$opt)".

Figure 8:
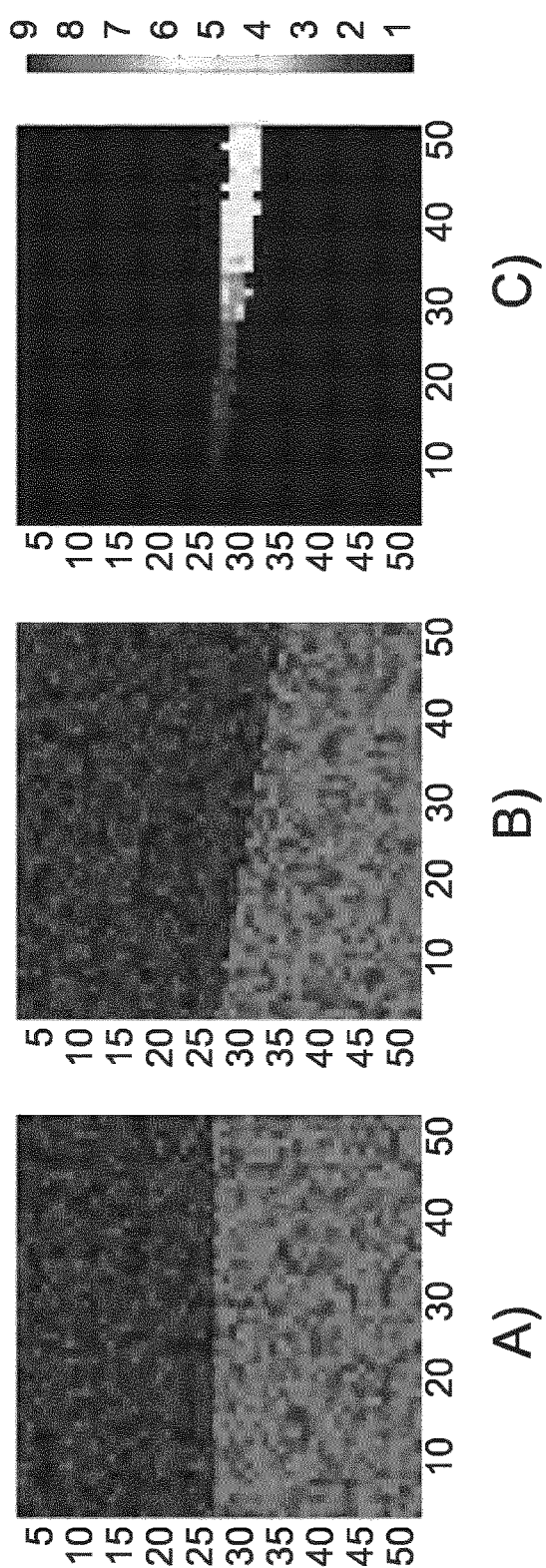
FIGS. 8 and 9 show exemplary visualizations of output data obtainable by the proposed method as per FIG. 4.
Figure 9:
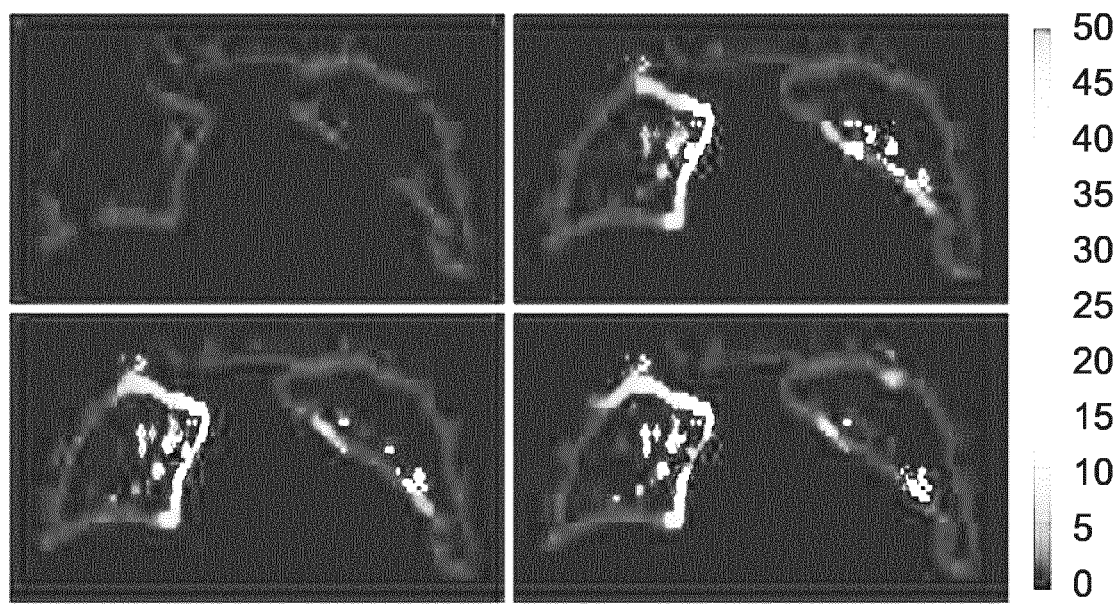

The value $\sigma$-opt may then be stored in a first output image $\Sigma$ at the current voxel position and optionally, one may store indicatorFunction($\sigma^2$-opt) in a second output image F at the current voxel position. The collection $\Sigma$ of $\sigma^2$-opt values at the different positions i, j, k may then be converted into spatial dimensions such as mm, and the spatial dimension may then be visualized as in color-coding as an estimated spatially resolved map for the estimated registration error. FIG. 8 (A-C) and FIG. 9 are examples for color or grey value encoded visualizations. Optionally, one may perform a smoothing or clustering of $\Sigma$.

Optionally, the error map may be overlaid onto the original image dataset A or B.

In a further visualization embodiment, in the output image $\Sigma$ all entries are set to zero where in the second output image F the respective values are above a certain threshold. More precisely, for each voxel position (i,j,k), $\Sigma(i,j,k)=0$ if F(i,j,k)>threshold. This thresholding allows achieving yet better noise robustness.

In one embodiment, the visualization includes a guiding functionality to guide the viewer through the image dataset to image regions with the largest estimated registration errors and these are displayed first.

In one embodiment, the registration is rerun with different parameter settings depending on the size of the estimated registration error in order to automatically improve the registration result and this can be optionally repeated upon user request.

Although the operation of the method in FIG. 4 has been explained for one image dimension (namely x dimension) only, the operation is understood to be applied in general for each spatial direction x, y, z. In the above, the scalar product operation is construed broadly to include any pointwise combination of response curves into weights and the summation of those weights along one, more or all spatial dimensions.

Accuracy estimation in the above method is based on the assumption that two images are similar to each other, if intensity changes occur at the same positions. For images acquired with different modalities and therefore different types of anatomical structures being encoded, it is likely that the set of image locations with changing intensity is different for the two images. For instance, it may be the case that a certain image structure such as that representative of a liver lesion is encoded only in the imagery acquired by the first modality but not in the imagery as acquired by the second modality. For our assumption this means that a missing intensity change ("edge") in one image does not necessarily mean that the images are misaligned. Thus, the proposed registration accuracy quantifier can be said to follow the rule "Two images are similar to each other, if intensity changes— if present—occur at the same positions". In yet other words, "false-positive" responses can be avoided. A mere presence of an edge structure at a location in one image and not in the other will not produce a mis-alignment response. This can be easily seen above in FIG. 6 where the combined response curve is based on the pointwise scalar-product computations: this will yield zero if the edge is not at the same location or is outside a certain neighborhood around said location.

Reference is now made to FIGS. 8 and 9, showing exemplary imagery obtained by application of the proposed method to more complex image data.

FIG. 8 shows synthetic test data A), B) with linearly increasing shift as compared to the simpler imagery in FIG. 5 with an edge with a mere constant shift. FIG. 8 A) and B) is a simulation of an imperfect registration output where the edge has been perfectly matched only at the left image boundary. Towards the right image boundary, the registration mismatch is linearly increasing. Registration mismatch has been estimated following the approach described above. The estimated registration error is visualized in FIG. 8, C).

FIG. 9 illustrates the application of method in FIG. 4 to real test data. The error images in FIG. 9 are based on a pair of coronal CT lung image data sets (acquired at exhalation state FIG. 8, D) and at inhalation state FIG. 8, E)) and are successfully registered in an iterative registration scheme resulting in a deformed inhalation image FIG. 8, F) being almost equal to the exhalation image.

For proof-of-concept purposes, the registration as per FIG. 8 D)-F) is repeated but this time excluding the last 30, the last 40, and the last 50 iteration steps, respectively, thus creating three artificially worsened results. The registration accuracy is then quantified for each of these three sets, where the top right of FIG. 9 shows the error for the registration where the last 30 iteration steps are dropped, the bottom left of FIG. 9 shows the error where the last 40 iteration steps have been dropped, and the bottom right shows the error when dropping the last 50 iteration steps. The amount of misalignment is grey-value coded and is seen to be directly related to the worsened registration accuracy as a consequence of the reduced number of iteration steps.

The top left in FIG. 9 shows, as reference image, practically no registration error, for the case when the registration algorithm was allowed to run until convergence.

The various components and modules in FIGS. 1 and 3 can be arranged as shown as separate functional units or modules but can also be merged into fewer, in particular, a single unit. For instance, in one embodiment the components are formed as different routines in a single software suit which can be executed by a general purpose computer such as a workstation associated with a specific imager or associated in a network with a group of imagers. Implementation other than in software is also envisaged, for instance by programming one or more field programmable gate arrays FPGA to perform the various functionalities. The components can also be implemented as a hardwired dedicated IC's (integrated circuits).

In another exemplary embodiment of the present invention, a computer program or a computer program element is provided that is characterized by being adapted to execute the method steps of the method according to one of the preceding embodiments, on an appropriate system.

The computer program element might therefore be stored on a computer unit, which might also be part of an embodiment of the present invention. This computing unit may be adapted to perform or induce a performing of the steps of the method described above. Moreover, it may be adapted to operate the components of the above-described apparatus. The computing unit can be adapted to operate automatically and/or to execute the orders of a user. A computer program may be loaded into a working memory of a data processor. The data processor may thus be equipped to carry out the method of the invention.

This exemplary embodiment of the invention covers both, a computer program that right from the beginning uses the invention and a computer program that by means of an up-date turns an existing program into a program that uses the invention.

Further on, the computer program element might be able to provide all necessary steps to fulfill the procedure of an exemplary embodiment of the method as described above.

According to a further exemplary embodiment of the present invention, a computer readable medium, such as a CD-ROM, is presented wherein the computer readable medium has a computer program element stored on it which computer program element is described by the preceding section.

A computer program may be stored and/or distributed on a suitable medium (in particular, but not necessarily, a non-transitory medium), such as an optical storage medium or a solid-state medium supplied together with or as part of other hardware, but may also be distributed in other forms, such as via the internet or other wired or wireless telecommunication systems.

However, the computer program may also be presented over a network like the World Wide Web and can be downloaded into the working memory of a data processor from such a network. According to a further exemplary embodiment of the present invention, a medium for making a computer program element available for downloading is provided, which computer program element is arranged to perform a method according to one of the previously described embodiments of the invention.

It has to be noted that embodiments of the invention are described with reference to different subject matters. In particular, some embodiments are described with reference to method type claims whereas other embodiments are described with reference to the device type claims. However, a person skilled in the art will gather from the above and the following description that, unless otherwise notified, in addition to any combination of features belonging to one type of subject matter also any combination between features relating to different subject matters is considered to be disclosed with this application. However, all features can be combined providing synergetic effects that are more than the simple summation of the features.

While the invention has been illustrated and described in detail in the drawings and foregoing description, such illustration and description are to be considered illustrative or exemplary and not restrictive. The invention is not limited to the disclosed embodiments. Other variations to the disclosed embodiments can be understood and effected by those skilled in the art in practicing a claimed invention, from a study of the drawings, the disclosure, and the dependent claims.

In the claims, the word "comprising" does not exclude other elements or steps, and the indefinite article "a" or "an" does not exclude a plurality. A single processor or other unit may fulfill the functions of several items re-cited in the claims. The mere fact that certain measures are re-cited in mutually different dependent claims does not indicate that a combination of these measures cannot be used to advantage. Any reference signs in the claims should not be construed as limiting the scope.

The invention claimed is:

1. An image processing system, comprising:
    an input port (IN) for receiving two or more input images for registration, including a source image and a target image;
    an iterative solver (SOLV-REG) configured to solve for a final registration transformation T(N) by iterating through at least one intermediate registration transformation T(N−j), wherein the iterative solver is driven by an optimization function comprising at least one first functional component based on a similarity measure that measures a similarity between the target image and a transformed image obtainable by applying the at least one intermediate registration transformation to the source image,
    a volume monitor (IVM) configured to monitor, over iteration cycles, for a change in volume of a predefined neighborhood around an image location in the source image when the intermediate registration transformation is being applied in a given iteration cycle;
    a volume evaluator (IVE) configured to evaluate said volume change against an acceptance condition; and
    a corrector (C) configured to mitigate or at least relatively mitigate, for a subsequent iteration cycle, an effect of the first functional component for said image location, when the change is found by the volume evaluator (IVE) to violate said acceptance condition.

2. The image processing system of claim 1, wherein said first functional component remains mitigated for said image location during a remainder of the iteration.

3. The image processing system of claim 1, wherein the volume changes around each image location are described by a vector field.

4. The image processing system of claim 3, wherein the acceptance condition is based on a deformation model.

5. The image processing system of claim 3, wherein the acceptance conditions are user adjustable.

6. The image processing system of claim 1, wherein the mitigating includes one or more of (a) disabling the functional component, and (b) amplifying the similarity measure.

7. An image processing method, comprising:
    receiving two or more input images for registration, including a source image and a target image;
    iteratively solving for a final registration transformation T(N) by iterating through at least one intermediate registration transformation T(N−j), wherein the iterative solving is driven by an optimization function comprising at least one first functional component based on a similarity measure that measures a similarity between the target image and a transformed image obtained by applying the at least one intermediate registration transformation to the source image,
    monitoring, over a plurality of iteration cycles, for a change in volume of a predefined neighborhood around an image location in the source image when the respective intermediate registration transformation is being applied in each of the plurality of iteration cycles;
    evaluating said volume change against a volume acceptance condition; and
    for a subsequent iteration cycle, mitigating or at least relatively mitigating an effect of the first functional component for said image location, when the volume change is found during the evaluating to violate said volume acceptance condition.

8. The image processing method of claim 7, wherein the volume changes around each image location are described by a vector field.

9. The image processing method of claim 8, wherein the acceptance condition is based on a deformation model.

10. The image processing method of claim 8, wherein the acceptance conditions are user adjustable.

11. The image processing method of claim 7, wherein the mitigating includes one or more of (a) disabling the functional component, and (b) amplifying the similarity measure.

12. A non-transitory computer readable medium comprising a computer program that when executed by a processing unit is (PU), causes the PU to:
    receive two or more input images for registration, including a source image and a target image;
    solve for a final registration transformation T(N) by iterating through at least one intermediate registration transformation T(N−j), wherein the iterative solving is driven by an optimization function comprising at least one first functional component based on a similarity measure that measures a similarity between the target image and a transformed image obtainable by applying the at least one intermediate registration transformation to the source image;
    monitor over a plurality of iteration cycles, for a volume change in a volume of a predefined neighborhood around an image location in the source image when the intermediate registration transformation is being applied in each of the plurality of iteration cycles;
    evaluate the volume change against a volume acceptance condition; and
    mitigate for a subsequent iteration cycle, an effect of the first functional component for said image location, when the volume change is found to violate said volume acceptance condition.

* * * * *